March 6, 1951
W. L. CHRISTENSEN
2,543,762
LIQUID FUEL AND ATOMIZING RING FOR
ANNULAR COMBUSTION CHAMBERS
Filed July 1, 1946
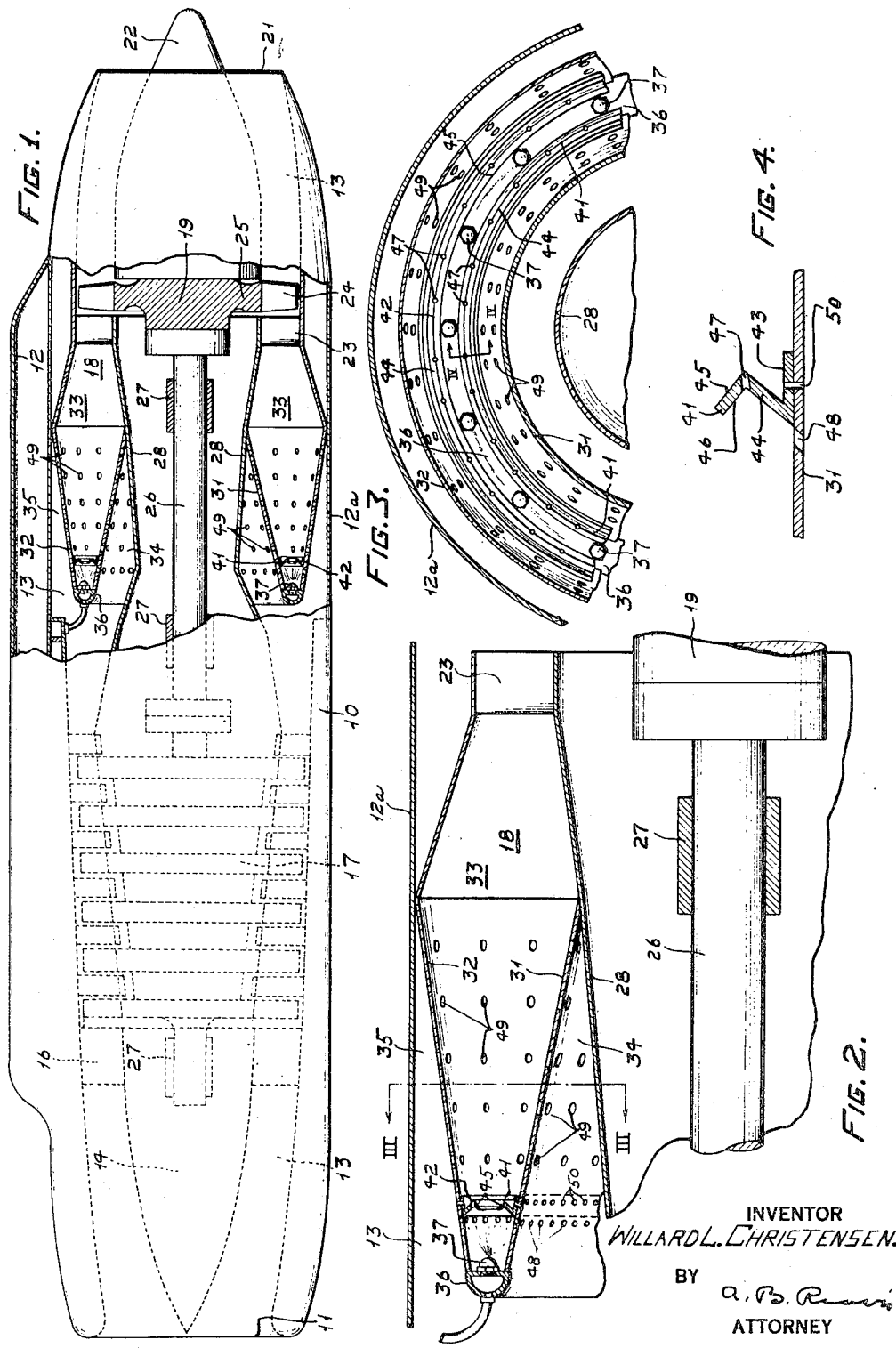
INVENTOR
WILLARD L. CHRISTENSEN.
BY
ATTORNEY Patented Mar. 6, 1951

2,543,762

UNITED STATES PATENT OFFICE 2,543,762

LIQUID FUEL AND ATOMIZING RING FOR ANNULAR COMBUSTION CHAMBERS

Willard L. Christensen, Moylan, Pa., assignor to Westinghouse Electric Corporation, East Pittsburgh, Pa., a corporation of Pennsylvania Application July 1, 1946, Serial No. 680,698

2 Claims. (Cl. 60—44)

This invention relates to combustion apparatus, more particularly to combustion chamber structure, and has for an object to provide novel structure of this character.

In combustion apparatus where liquid fuel is supplied to a combustion chamber through atomizing nozzles, it frequently occurs under certain conditions of operation that some of the fuel from the atomizing nozzles sprays onto the combustion chamber walls and collects there in drops or streams. Such fuel collection usually occurs under conditions of high fuel rates and low air flow, resulting in inefficient mixing of the fuel and air with consequent long flames and inefficient burning, or of low fuel rates, where the main atomizing nozzles do not operate under sufficient pressure to prevent fuel dribbling down onto the combustion chamber walls in rather large drops.

To overcome this difficulty, the present invention proposes the use of a fuel-collecting and atomizing ring of trough-like cross section disposed against the inner surface of the combustion wall just downstream of the zone at which fuel tends to collect on said wall, with the trough opening upstream.

The fuel deposited on the combustion chamber walls collects in the trough of the ring and is reatomized through atomizing openings provided in the bottom of the trough at spaced intervals therealong. Additional air for this reatomization enters the combustion chamber through openings in the side walls of the latter in circumferential alignment with the atomizing openings of the trough-like ring, the air entering through the side wall openings passing through the aligned openings in the trough and carrying with it the fuel collected in the trough, in atomized streams.

Therefore, another object of the invention is to provide, in combustion apparatus, means for trapping liquid fuel collecting on the walls of the combustion chamber.

A further object of the invention is to provide, in combustion apparatus, means for atomizing liquid fuel collecting on the walls of the combustion chamber.

Another object of the invention is to provide, in combustion apparatus, means for collecting and atomizing liquid fuel deposited on the walls of the combustion chamber.

These and other objects are effected by the invention as will be apparent from the following description and claims taken in connection with the accompanying drawing, forming a part of this application, in which:

Fig. 1 is a side elevational view of a gas turbine power plant incorporating the present invention, a portion of the outer casing and part of the inner structure being broken away to better illustrate the novel features;

Fig. 2 is an enlarged sectional view of half of a combustion chamber such as shown in the power plant of Fig. 1;

Fig. 3 is an enlarged transverse sectional view, taken along the line III—III of Fig. 2, looking in the direction indicated by the arrows; and Fig. 4 is an enlarged fragmentary sectional view, taken along the line IV—IV of Fig. 3, looking in the direction indicated by the arrows.

The present invention, although not limited thereto, is particularly adapted for use with a gas turbine power plant of the type employed on aircraft to drive a propeller or an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located adjacent the compressor and the turbine for heating the compressed air and which discharges the hot gases at suitable temperature and pressure to the turbine. The spent gases on leaving the turbine are discharged through a nozzle provided at the rear of the casing and may aid in propelling the aircraft.

Referring now to the drawing more in detail, the power plant shown in Fig. 1, and indicated in its entirety by the reference character 10, is adapted to be mounted in or on the fuselage or wing of an aircraft with the left end or intake 11, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial-flow compressor 17, combustion apparatus generally indicated 18, a turbine 19 which drives the compressor, and a nozzle 21 defined by the casing 12a and by a tailpiece 22, the latter being mounted concentrically in the casing and cooperating with the latter to provide the propulsion nozzle.

Air enters at the intake 11 and flows substantially straight through the plant, passing through the compressor 17 where its pressure is raised, and into the combustion apparatus 18 where it is heated. The hot gases, comprising the products of combustion and excess air heated by the combustion, on leaving the combustion apparatus are directed by suitable guide vanes or nozzles 23 against the blades 24 of the turbine disc 25 and then are discharged through the propulsion nozzle 21 to propel the aircraft.

By reference to Fig. 1, it will be seen that the compressor and turbine rotors are interconnected by means of a shaft 26 supported by suitable bearings 27 and enclosed by an inner wall structure, generally indicated 28, which protects the shaft and bearings from high temperatures and also defines a portion of the annular air flow passage 13 in which the combustion apparatus 18 is disposed.

The present invention is not limited to the specific details or arrangements of structure thus far described, but is primarily concerned with the combustion apparatus, indicated generally at 18.

A pair of frusto-conical inner and outer wall members 31 and 32, respectively, separate the annular flow passage 13, at the region of the combustion apparatus 18, into an annular burner space or combustion chamber 33 overlapped both inwardly and outwardly by annular air spaces 34 and 35, respectively. The inner wall 31 is disposed with its base or larger end upstream and the outer wall 32 has its larger end or base downstream, with the result that the burner space 33 defined thereby increases in cross-sectional area from its upstream end to its downstream end. Conversely, the inner and outer overlapping air spaces 34 and 35, the former defined by the walls 28 and 31 and the latter by the walls 12a and 32, decrease in cross-sectional area from their upstream ends to their downstream ends.

Preferably, the upstream end of the burner space 33 is closed by an annular wall 36, in which is mounted an annular series of fuel nozzles 37 adapted to direct the fuel discharged therefrom downstream in directions generally parallel to the longitudinal axis of the power plant.

As previously pointed out, there are certain conditions of operation under which drops of liquid fuel form on the walls 31 and 32 in the region thereof just downstream of the nozzles 37. These drops tend to flow to the lowest point in the burner space and may cause hot spots when burning, or they may leak out of the combustion chamber and create a fire hazard.

In accordance with the present invention, liquid fuel-collecting and atomizing rings 41 and 42 are secured to the side walls 31 and 32, respectively, of the burner space 33 just downstream of the burner space wall area on which the fuel drops are deposited. Each ring comprises a first section or base 43 adapted to be welded, or otherwise secured, to the adjacent wall 31 or 32. A second section 44 extends inwardly and rearwardly from the forward edge of the base section 43, while a third section 45 projects inwardly and forwardly from the inner edge of the second section 44, the sections 44 and 45 cooperating to provide a liquid fuel collection trough or groove 46 opening upstream. A plurality of atomizing openings 47 are provided in the bottom of each trough 46 and provide for emission of air and atomized fuel from the troughs. The air for atomization of fuel from the troughs is admitted to the burner space through openings 48 in the walls 31 and 32, which are inclined rearwardly and are generally longitudinally aligned with the openings 47 in the bottom of the troughs 46.

The usual supply of air for combustion and cooling purposes is admitted to the burner space 33 through longitudinally-extending rows of openings 49, and additional openings 50 may be provided for directing cooling air against the downstream surface of the ring section 44 (Fig. 4).

While the invention has been shown in but one form, it will be obvious to those skilled in the art that it is not so limited, but is susceptible of various changes and modifications without departing from the spirit thereof.

What is claimed is:

1. In combustion apparatus, wall structure defining a combustion chamber having a circular side wall, a nozzle adapted to spray atomized fuel into said chamber, and a ring secured to said combustion chamber circular side wall in the path of any fuel drops deposited on said side wall by said nozzle, said ring having a fuel-receiving groove in the upstream side thereof facing said nozzle and a plurality of openings through a wall of said groove, and air admission openings in said circular side wall upstream of said groove, pairs of said side wall and groove openings lying in common axially-extending radial planes, whereby some of the air entering said combustion chamber through said side wall openings passes through said groove openings and entrains any liquid fuel in said groove.

2. In combustion apparatus, wall structure defining an annular burner space and inner and outer overlapping annular air spaces, said structure including inner and outer annular walls separating said burner space from said inner and outer annular air spaces, respectively; an annular series of nozzles associated with said wall structure at the upstream end of said burner space and adapted to spray atomized fuel longitudinally of said burner space; and a pair of rings secured one to each of said inner and outer walls within said burner space near said annular series of nozzles, each of said rings having a liquid fuel collection groove in its upstream side, and a plurality of openings through said ring from said grooves for discharge therefrom of liquid fuel trapped therein, said inner and outer walls having air admission openings therein upstream of said ring, said wall openings and groove openings being so disposed that some of the air entering the burner space from the overlapping air spaces through said wall openings passes through said groove openings and entrains any liquid fuel collected in said grooves.

WILLARD L. CHRISTENSEN.

REFERENCES CITED

The following references are of record in the file of this patent:

UNITED STATES PATENTS

| Number | Name | Date |
| --- | --- | --- |
| 1,785,501 | Secor | Dec. 16, 1930 |
| 2,010,920 | Karsel | Aug. 13, 1935 |
| 2,080,425 | Lysholm | May 18, 1937 |
| 2,368,179 | Turpin | Jan. 30, 1945 |
| 2,395,418 | McCollum | Feb. 26, 1946 |
| 2,399,046 | Larrecq | Apr. 23, 1946 |
| 2,435,836 | Johnson | Feb. 10, 1948 |